United States Patent
Joong et al.

(10) Patent No.: US 6,548,920 B2
(45) Date of Patent: Apr. 15, 2003

(54) LINEAR MOTOR AND METHOD OF PRODUCING THE SAME

(75) Inventors: Kim Houng Joong, Hitachi (JP); Hiromitsu Seino, Iwaki (JP); Ryouichi Naganuma, Hitachinaka (JP); Hiroshi Toyoda, Hitachiota (JP); Kohji Maki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 32 days.

(21) Appl. No.: 09/796,618

(22) Filed: Mar. 2, 2001

(65) Prior Publication Data

US 2002/0053835 A1 May 9, 2002

(30) Foreign Application Priority Data

Nov. 6, 2000 (JP) .......................... 2000-342375

(51) Int. Cl.$^7$ ............................... H02K 41/03
(52) U.S. Cl. .......................... 310/12; 318/135
(58) Field of Search ................. 310/12, 13, 14

(56) References Cited

U.S. PATENT DOCUMENTS 4,254,350 A * 3/1981 Miroshnichenko et al. ... 310/13
4,945,268 A * 7/1990 Nihei et al. ................. 310/12

FOREIGN PATENT DOCUMENTS

JP H10174418 6/1998

OTHER PUBLICATIONS

U.S. application No. 09/959,615 (Assignee: Hitachi, Ltd. PCT Application No. PCT/JP00/02808 (Filing Date: 2000, 4, 7), Base application No. H11–127081, Title of the Invention: Linear Motor and Manufacturing Method Thereof).

* cited by examiner

Primary Examiner—Nestor Ramirez
Assistant Examiner—Judson H. Jones
(74) Attorney, Agent, or Firm—Antonelli, Terry, Stout & Kraus, LLP

(57) ABSTRACT

A linear motor and a method of producing the linear motor are provided to reduce a leak magnetic flux flowing between an armature and a moving element to reduce a one-direction magnetic attraction force generated between the armature and the moving element. The linear motor includes the armature having a core formed of a magnetic body and a winding wound around the core, and the moving element supported so as for the moving element to move relatively to the armature via a gap, magnetic pole teeth disposed above and below the moving element, disposed at predetermined pitches along a moving direction of the moving element and disposed opposite to each other via the moving element, and a winding for exciting the magnetic pole teeth such that adjacent and opposite magnetic pole teeth have different magnetic poles, and the moving element is reciprocated relatively to the armature by exciting the winding according to a predetermined control circuit.

7 Claims, 17 Drawing Sheets

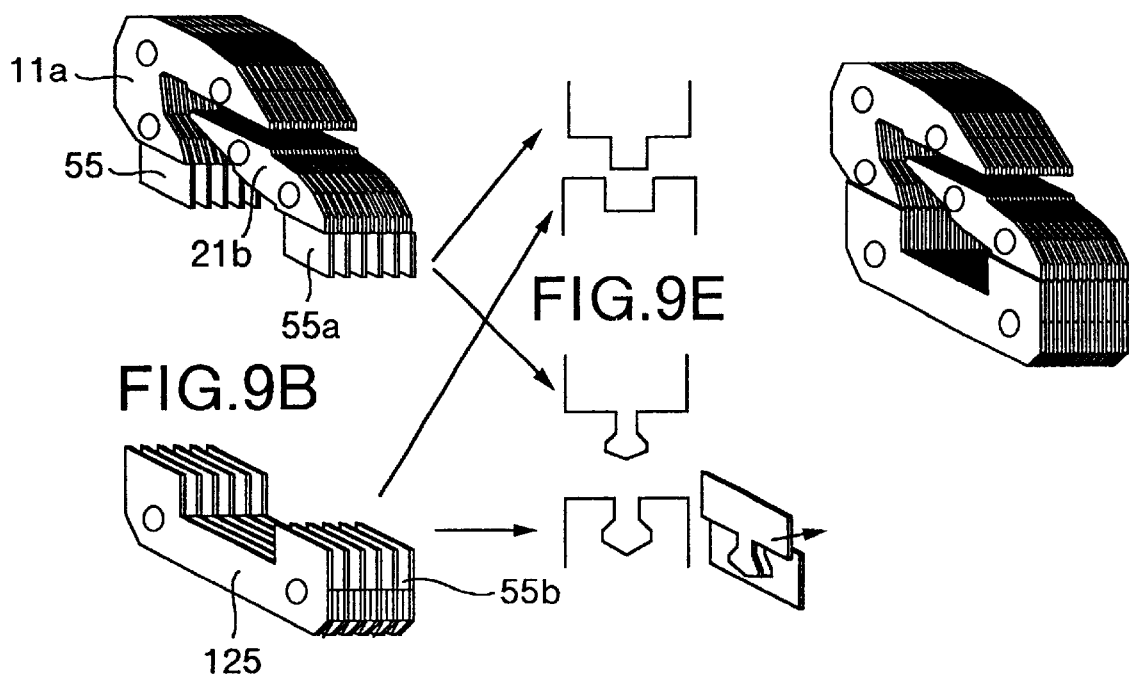

LINEAR MOTOR AND METHOD OF PRODUCING THE SAME

BACKGROUND OF THE INVENTION

1. Field of the Invention

The present invention relates to a linear motor and a method of producing it.

The present invention relates particularly to a linear motor in which one coil is wound around an armature, upper and lower magnetic poles are disposed opposite to each other, and magnetic pole teeth of the upper magnetic pole are disposed alternately with the teeth of the lower magnetic pole, and to a method of producing the linear motor.

2. Description of Related Art

Linear motors having various structures have heretofore been proposed. However, the conventional linear motor structured such that a rotating machine is cut to open and linearly driven is used in many cases.

In the conventional linear motor in which the rotating machine is cut to open and linearly driven, much magnetic flux leaks between an armature and a moving element, a motor thrust is small with respect to an exciting current, and motor efficiency is bad. Furthermore, since a magnetic attraction force acts in one direction between the armature and the moving element, a large burden is applied to a moving element support mechanism, structure is distorted, various troubles occur, and it has been difficult to practically use the linear motor.

SUMMARY OF THE INVENTION

An object of the present invention is to provide a linear motor in which a leak magnetic flux flowing between an armature and a moving element is reduced to reduce a one-direction magnetic attraction force generated between the armature and the moving element, and a method of producing the linear motor.

To achieve the object, according to the present invention, there is provided a linear motor provided with an armature including a core formed of a magnetic body and a winding wound around the core, and a moving element supported in such a manner that the moving element can move with respect to the armature via a gap. The linear motor comprises magnetic pole teeth disposed above and below the moving element, disposed at predetermined pitches along a moving direction of the moving element and disposed opposite to each other via the moving element, and a winding for exciting the magnetic pole teeth such that adjacent and opposite magnetic pole teeth have different magnetic poles. The moving element, magnetic pole teeth, and winding constitute the linear motor, and the moving element is reciprocated and moved with respect to the armature by exciting the winding in accordance with a predetermined control circuit.

In other words, the linear motor includes an armature and a moving element capable of moving with respect to the armature. The linear motor further includes one magnetic pole teeth row which is magnetically connected to one magnetic pole of the armature and in which first and second stages of magnetic pole teeth are separated and arranged substantially in a vertical direction to a moving direction of the moving element, and the other magnetic pole teeth row which is magnetically connected to the other magnetic pole of the moving element and in which first and second stages of magnetic pole teeth are separated and arranged substantially in the vertical direction to the moving direction of the moving element. The magnetic pole teeth of the first stage of the magnetic pole teeth row are disposed alternately with the magnetic pole teeth of the first stage of the other magnetic pole teeth row with respect to the moving direction of the moving element. The magnetic pole teeth of the second stage of the magnetic pole teeth row are disposed alternately with the magnetic pole teeth of the second stage of the other magnetic pole teeth row with respect to the moving direction of the moving element. The moving element may be disposed between the magnetic pole teeth of the first stages of the magnetic pole teeth rows and the magnetic pole teeth of the second stages of the magnetic pole teeth rows.

BRIEF DESCRIPTION OF THE DRAWINGS

FIGS. 9A, 9B, 9C, 9D and 9E are views showing another embodiment (No. 2) of the divided core in the armature of the present invention.

DETAILED DESCRIPTION OF THE PREFERRED EMBODIMENTS

Figure 1A:
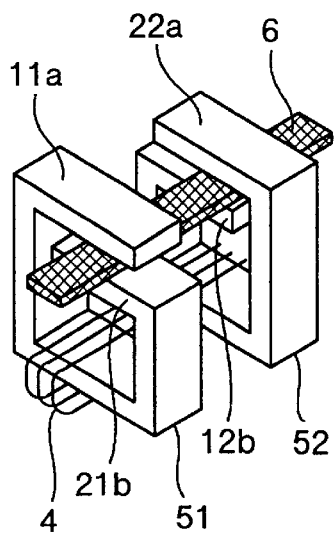
FIGS. 1A and 1B show a basic constitution of a linear motor according to the present invention.

Embodiments of the present invention will be hereinafter described with reference to the drawings. Moreover, in the drawing, constituting elements denoted with the same reference numerals are the same as one another and correspond to one another.

Figure 1B:
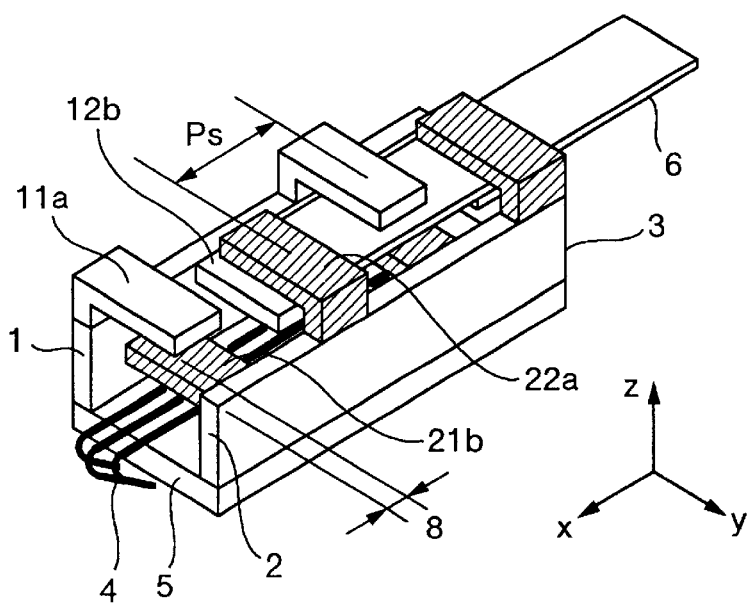

FIGS. 1A and 1B show a basic constitution of a linear motor according to an embodiment of the present invention.

FIG. 1A shows the basic constitution of the linear motor according to one embodiment of the present invention, and FIG. 1B schematically shows an example in which the basic constitution is provided with multiple poles.

In FIG. 1A, reference numeral 51 denotes a core including first opposite portions, and 52 denotes a core including second opposite portions. In the cores 51 and 52, upper and lower magnetic poles are disposed alternately with each other.

Here, an upper magnetic pole tooth 11a and a lower magnetic pole tooth 21b of the core 51 are defined as the first opposite portion, and a lower magnetic pole tooth 12b and an upper magnetic pole tooth 22a of the core 52 are defined as the second opposite portion. Therefore, an armature is constituted such that a (2n−1)-th core forms the first opposite portion and a (2n)-th core forms the second opposite portion (additionally, n=1, 2, 3, . . . ).

Moreover, as shown in FIG. 1A, one winding 4 is wound around the cores 51 and 52, but the winding may be wound around a plurality of divided portions of the core.

A moving element 6 is put and held between the first opposite portions of the core 51 and between the second opposite portion of the core 52, and moves with respect to the armature in the linear motor. Here, the armature is constituted of the core and winding 4, and the moving element is constituted of a permanent magnet, magnetic body, and nonmagnetic body.

Moreover, a constant gap 8 is disposed between the upper and lower magnetic pole teeth of each the opposite portions. When the moving element is passed through the gap 8, a structure is formed such that the moving element is held by the first and second opposite portions. As described above, in the present embodiment, the armature in which magnetic fluxes alternate and vertically flow between the upper and lower magnetic pole teeth is formed in the gap between the upper and lower magnetic pole teeth in each the opposite portions of the linear motor. Moreover, the moving element moves relatively to the armature through the gap.

Figure 2A:
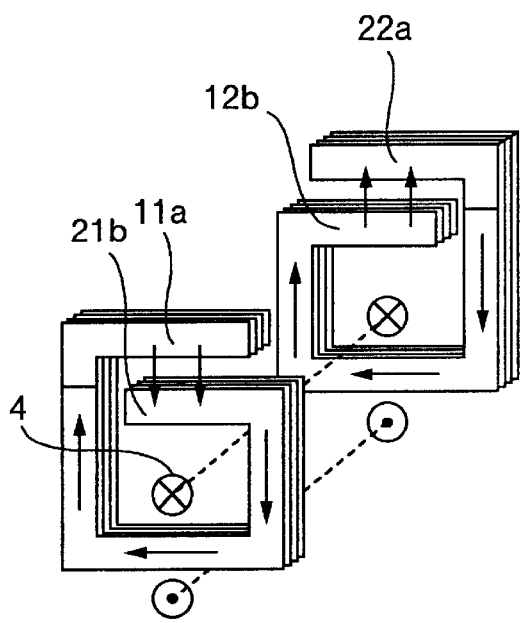
FIGS. 2A and 2B are schematic views showing a linear motor magnetic flux flow and an assembly constituted of laminated steel plates.
Figure 2B:
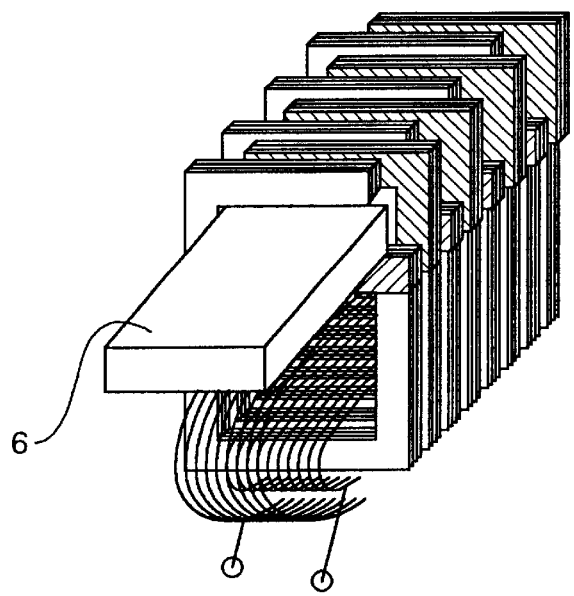

FIGS. 2A and 2B are schematic views showing a concept with which the magnetic flux flows, and an assembly of laminated steel plates in the linear motor of the present embodiment.

In the aforementioned constitution, as shown in FIG. 2A, an armature 3 is formed in the gap between the upper magnetic pole teeth (11a, 22a) and the lower magnetic pole teeth (21b, 12b) of the respective opposite portions of the armature 3 such that the magnetic fluxes alternate and vertically flow between the upper and lower magnetic pole teeth. In this structure, the moving element 6 moves relatively to the armature through the gap.

Moreover, in the linear motor of the present embodiment, an attraction force acting on the moving element 6 and upper magnetic pole teeth (11a, 22a) is substantially the same as an attraction force acting on the moving element 6 and lower magnetic pole teeth (21b, 12b). Furthermore, directions in which the attraction forces act are opposite to each other, so that the entire attraction force is small. Therefore, the attraction force between the moving element 6 and the magnetic pole teeth of the armature 3 can be reduced, and a burden of a support mechanism can be reduced.

In FIG. 2B, the armature 3 is formed of laminated steel plates, a plurality of first opposite portions are disposed alternately with a plurality of second opposite portions in this structure. Moreover, a core portion with the winding 4 of the armature 3 wound therearound and the opposite portion with the moving element 6 held therein are divided and assembled with the laminated steel plates.

Figure 3:
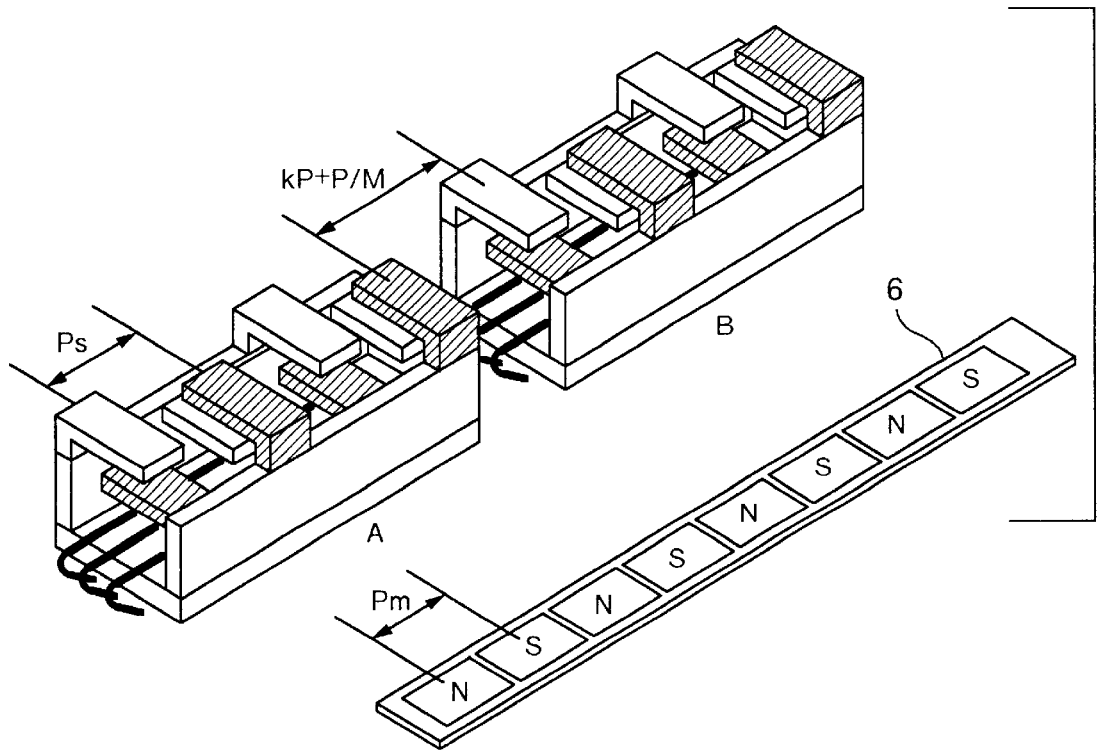
FIG. 3 is a schematic view of arrangement in the linear motor according to an embodiment of the present invention.

FIG. 3 is a schematic view of arrangement in the linear motor according to the embodiment of the present invention.

Here, FIG. 3 shows that two armatures 3 are arranged in series. Winding excitation is changed while a phase difference of an electric angle 90° is set between A and B phases. Thereby, a proceeding magnetic field is generated, and the moving element 6 moves relative to the armatures.

This also applies in a similar operation to arrangement in which a plurality of linear motors of the present invention are arranged in parallel with one another and a plurality of moving elements are integrally formed.

When a plurality of armatures 3 of the linear motor are arranged, and a pole pitch is set to P, a pitch between magnetic pole teeth of the armatures 3 adjacent to each other and different in magnetic poles from each other is (k·P+P/M) {(k=0, 1, 2, . . . ), (M=2, 3, 4, . . . )} {wherein k denotes a numeral arbitrarily selected in a range in which the armatures 3 adjacent to each other can be arranged, and M denotes the number of phases of the motor}.

Additionally, 1-phase and 2-phases linear motors have been described in the embodiment of the present invention, but the present invention can be applied to multi-phase linear motors such as 3-phase, 4-phase, and 5-phase linear motors.

Figure 19A:
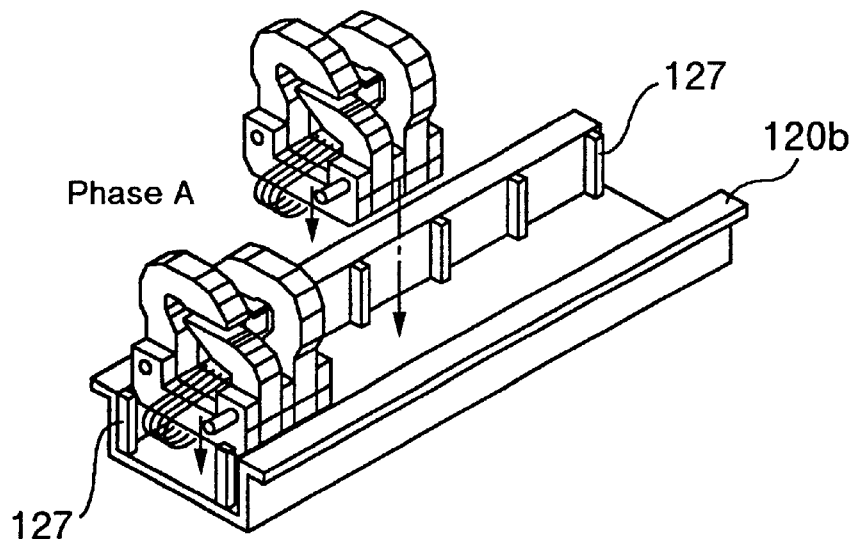
FIGS. 19A and 19B are views showing one embodiment of three-phase arrangement in the linear motor of the present invention.
Figure 19B:
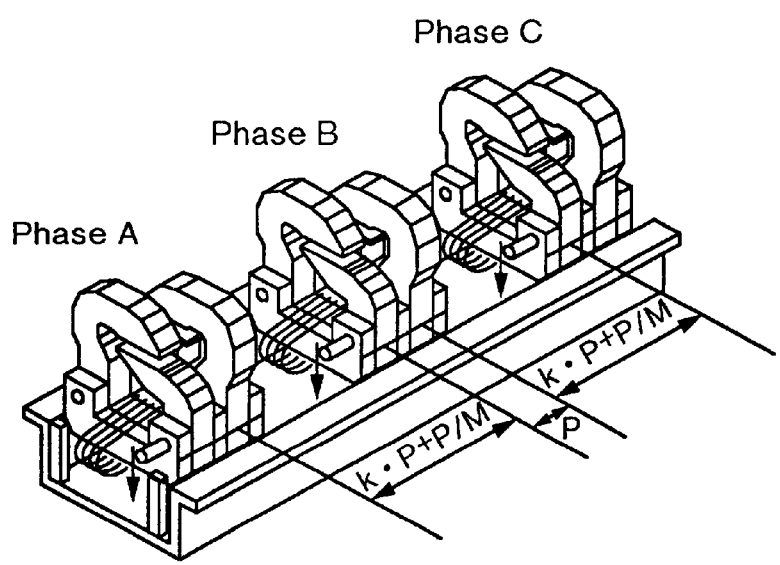

FIGS. 19A and 19B show one embodiment of three-phase arrangement of the armatures according to the present invention.

In FIGS. 19A and 19B, projections 127 are attached to a lower housing 120b in such a manner that armature units of respective phases are contained at predetermined intervals. This facilitates assembling of the respective phase armatures. Conversely, when projections are formed on the armature unit, and recessed portions or grooves are formed in the lower housing 120b, the same function is fulfilled. The armature core is formed of the laminated steel plates, but may be molded.

Figure 4:
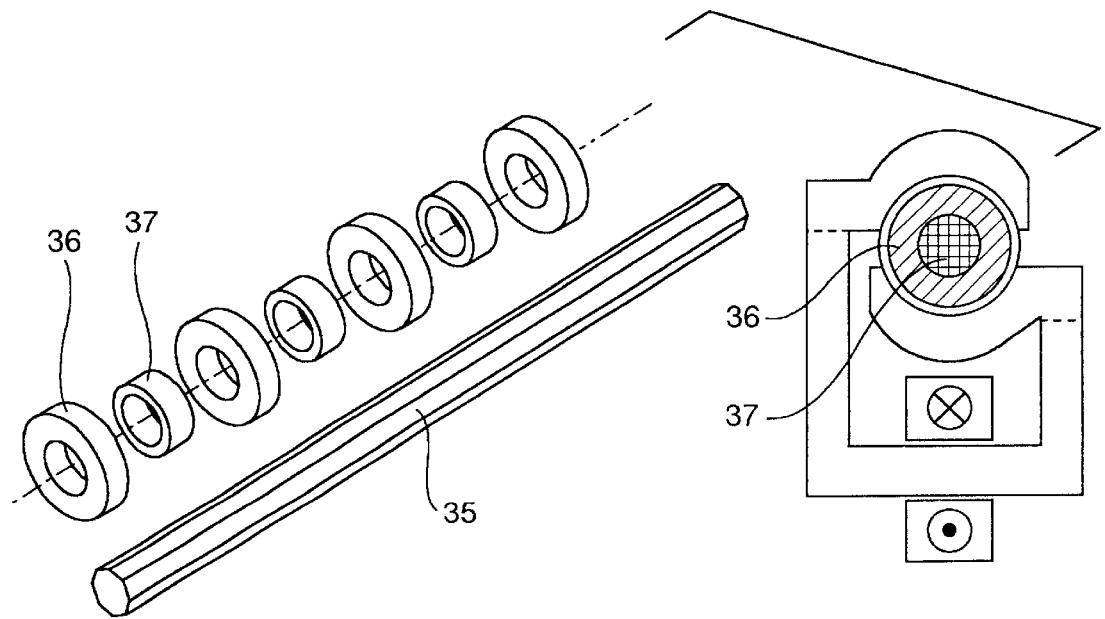
FIG. 4 is a view showing another embodiment of a moving element in accordance with the present invention.

FIG. 4 shows another embodiment in which a cylindrical moving element is used instead of the plate moving element.

In FIG. 4, a ferromagnetic body 36 and a nonmagnetic body 37 are alternately attached to a shaft 35 in a combination. Moreover, a permanent magnet may be used. Moreover, FIG. 4 shows that a degree of freedom of an armature core shape is high in accordance with a moving element shape.

Figure 5:
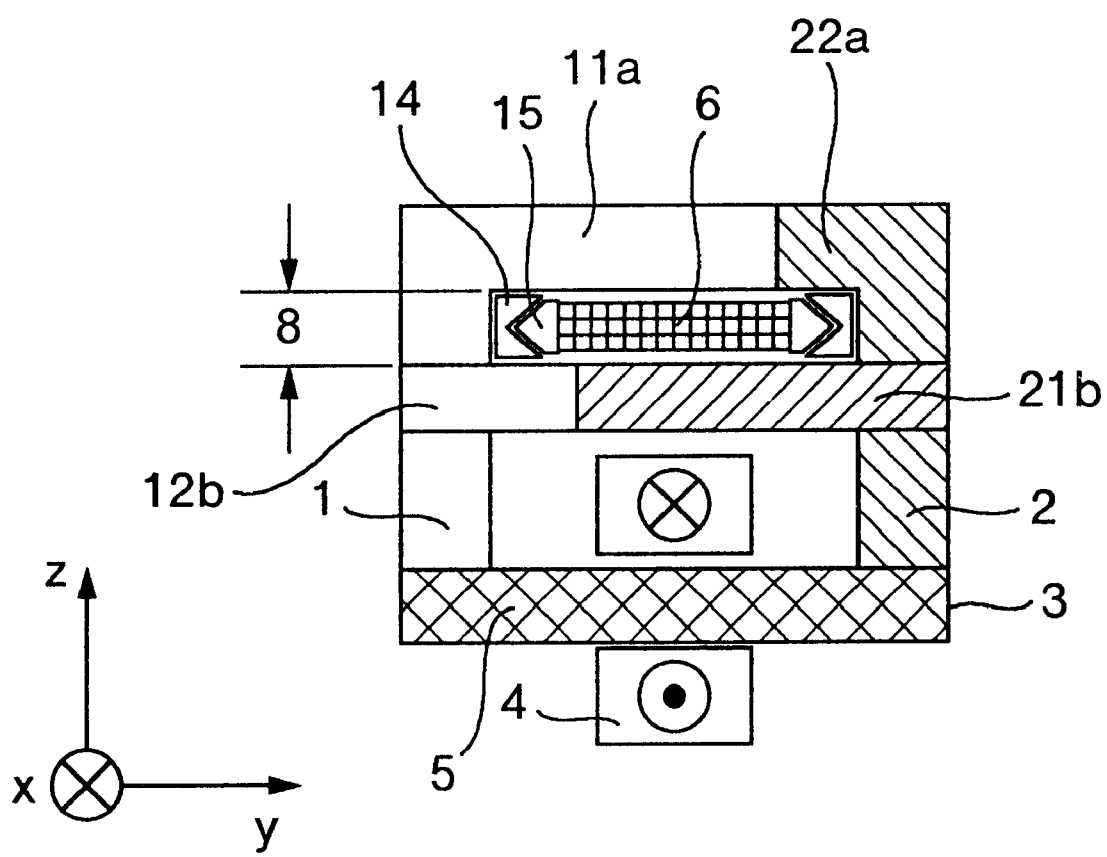
FIG. 5 is a sectional view of the linear motor of the present invention.

FIG. 5 is a sectional view of the linear motor according to the embodiment of the present invention.

In FIG. 5, a support mechanism 14 is disposed on a side of an armature 3, and a support mechanism 15 is disposed on a moving element 6 side in such a manner that the moving element 6 moving relative to the armature is supported. Therefore, the moving element 6 is supported by the support mechanisms 14, 15, and moves relative to the armature through the gap 8 as if the element were passed through a tunnel.

Figure 6A:
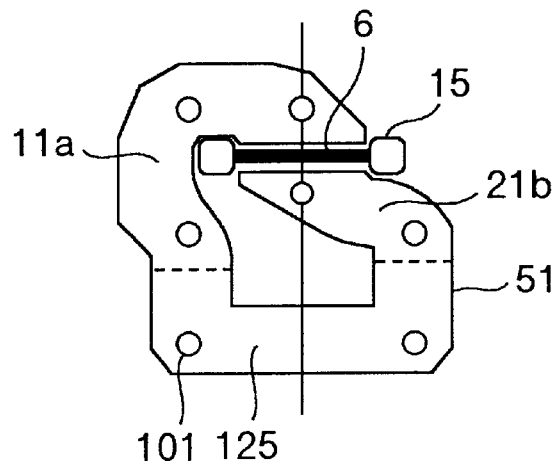
FIGS. 6A, 6B and 6C are sectional views of another embodiment (No. 1) in the linear motor of the present invention.
Figure 6B:
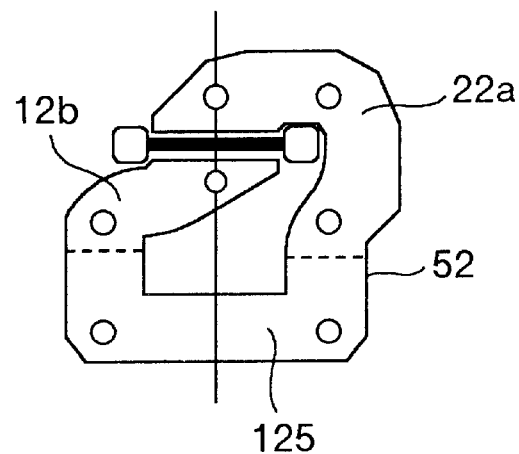
Figure 6C:
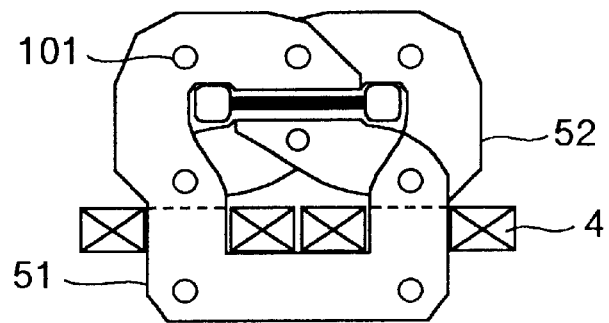

FIGS. 6A, 6B and 6C are sectional views of another embodiment in the linear motor of the present invention.

In FIGS. 6A to 6C, a second opposite portion 52 of FIG. 6B is reverse to a first opposite portion 51 of FIG. 6A. The opposite portions are superposed upon each other as shown in FIG. 6C. A plurality of through holes 101 formed in the core are positioned such that the through holes of superposed portions are aligned with one another in a lamination of a plurality of first and second opposite portions 51 and 52. Therefore, the through holes 101 may effectively be used to caulk the portions with a bolt, a rivet, and the like.

Figure 7A:
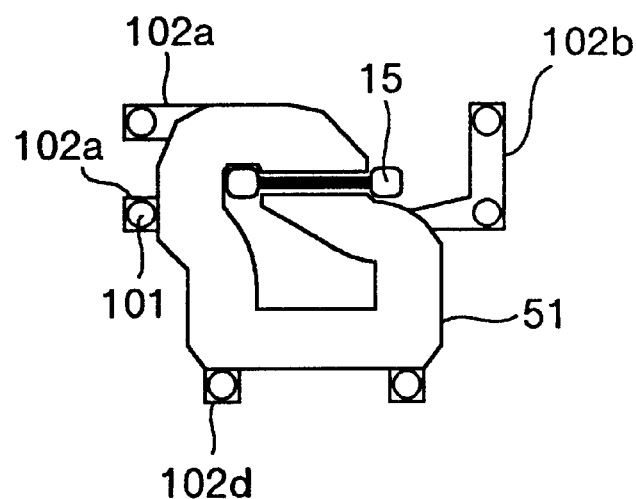
FIGS. 7A, 7B and 7C are sectional views of another embodiment (No. 2) in the linear motor of the present invention.
Figure 7B:
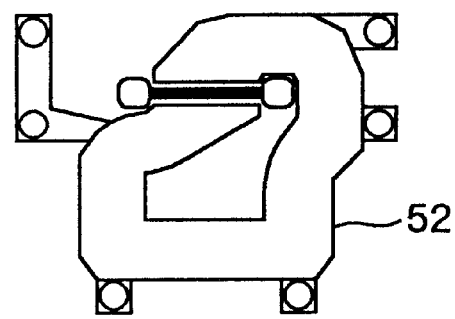
Figure 7C:
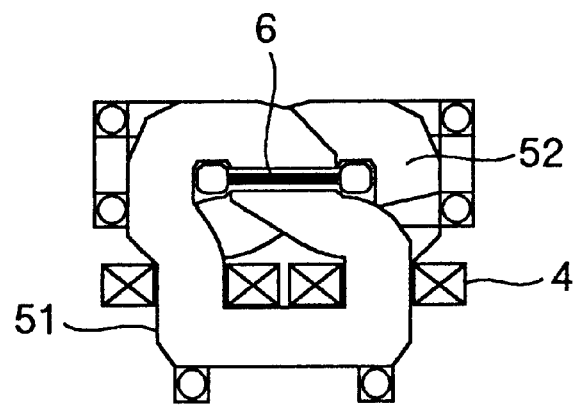

FIGS. 7A, 7B and 7C are sectional views of another embodiment in the linear motor of the present invention.

In FIGS. 7A to 7C, the basic core shape is similar to that shown in FIGS. 6A to 6C, except that arms 102 are projected out of the core in order to form a plurality of through holes 101 in the arms. Similarly as FIGS. 6A to 6C, the second opposite portion 52 of FIG. 7B is reverse to the first opposite portion 51 of FIG. 7A, and the portions are superposed upon each other as shown in FIG. 7C. The plurality of through holes 101 are positioned such that the through holes of the superposed portions are aligned with one another in the lamination of a plurality of first and second opposite portions 51 and 52.

Moreover, the through holes shown in FIGS. 6A to 6C may partially be combined with those shown in FIGS. 7A to 7C.

FIGS. 8A, 8B and 8C and 9A, 9B, 9C, 9D and 9E schematically show embodiments of divided cores in the linear motor of the present invention.

Figure 8A:
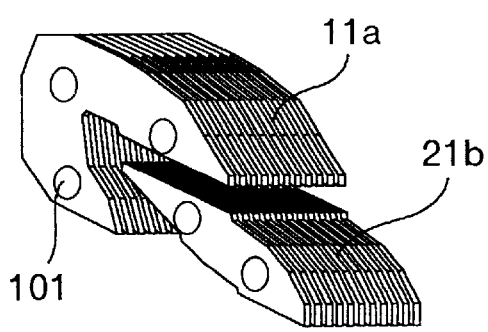
FIGS. 8A, 8B and 8C show another embodiment (No. 1) of a divided core in an armature of the present invention.
Figure 8C:
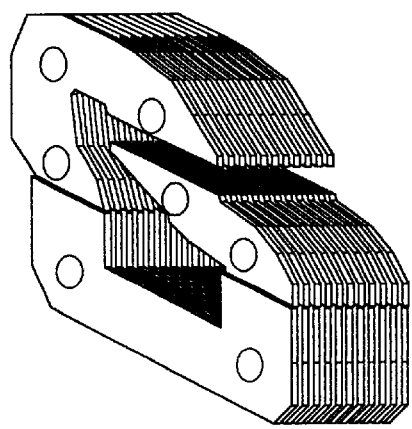
Figure 8B:
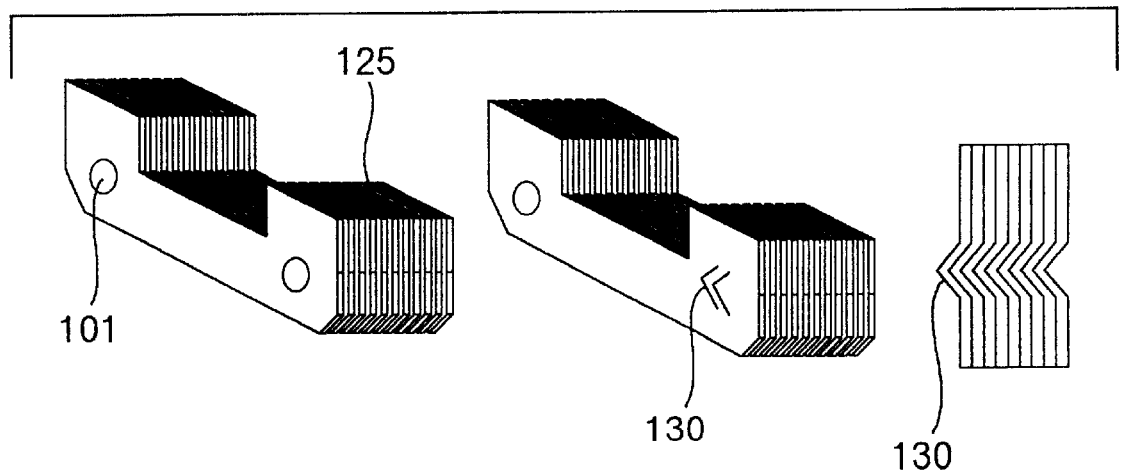

In FIGS. 8A to 8C, FIG. 8A shows the upper magnetic pole teeth 11a and lower magnetic pole teeth 21b between which the moving element is held, and FIG. 8B shows a core 125 corresponding to a winding core, and FIG. 8C shows a combination of the teeth and core.

In FIGS. 9A to 9E, cores 55a intermittently different in length from one another are laminated in the upper and lower magnetic pole teeth 11a and 21b, cores 55b intermittently different in length with one another are laminated to form the recessed portion in the core 125, and the cores are assembled with one another such that an indentation is combined with a projection in a contact portion of upper and lower cores.

When the recessed portion is combined with the projection in the contact portion of the upper and lower cores, these may be pressed onto each other in vertical and horizontal directions. One embodiment is shown in FIG. 9E.

Moreover, in a method of caulking the respective laminated steel plates of the divided upper magnetic pole teeth 11a, lower magnetic pole teeth 21b, and core 125, as shown in FIG. 8B, the steel plates with recessed portions 130 formed therein are laminated, pressure is finally applied to the lamination, and the lamination is caulked. Alternatively, the lamination may be caulked with a rivet, a welding material, an adhesive material, and the like.

Here, an advantage of a winding operation in the divided core will be described. The core portion in which the armature winding is to be disposed is manufactured integrally with the core of a magnetic pole portion including the opposite portions with the moving element held therein, and the winding 4 is wound around the produced structure. In this case, the winding needs to be wound several times in a thickness direction of the laminated core portion. However, the core portion in which the armature winding is to be disposed, and the core of the magnetic pole teeth portion including the opposite portions with the moving element held therein are manufactured in a divided structure. In this case, as shown in FIG. 15, the winding 4 can easily be inserted.

Figure 10:
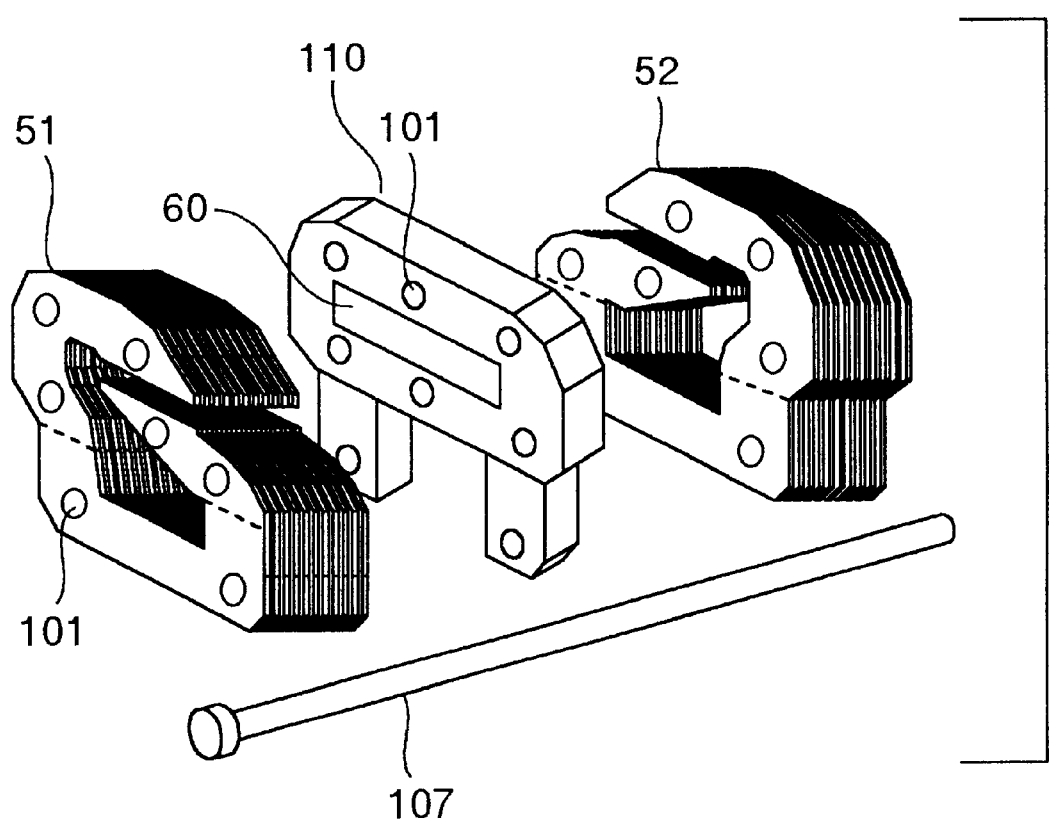
FIG. 10 is an exploded view of the assembly of the armature according to the present invention.

FIG. 10 is an exploded view of the assembly of the armature in the linear motor of the present invention.

In FIG. 10, a duct 110 is disposed between the first opposite portion 51 and the second opposite portion 52, and a fixing member 107 is passed through the through holes 101 and caulked. Here, a bolt, a rivet, a pin, and the like may be used in the fixing member 107. Moreover, the duct 110 is structured such that the moving element 6 can freely move with respect to the armature, and is further structured to function as a bearing for supporting the moving element.

Figure 11A:
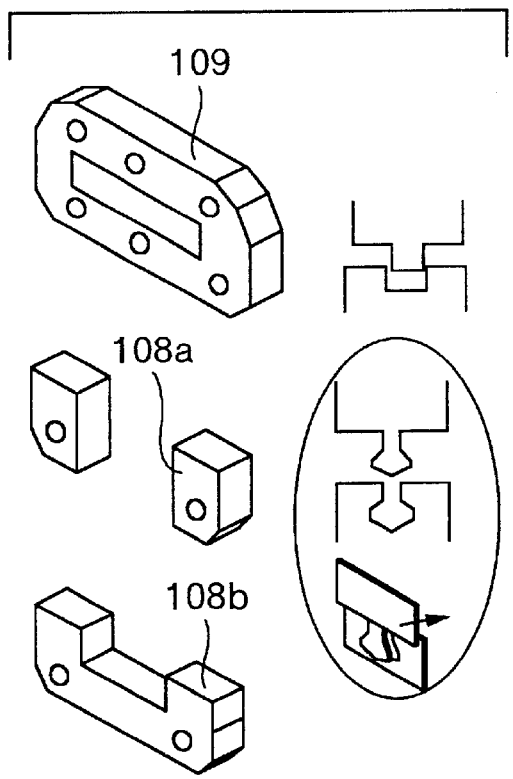
FIGS. 11A, 11B and 11C are illustrations of a duct combination in the linear motor of the present invention.
Figure 11B:
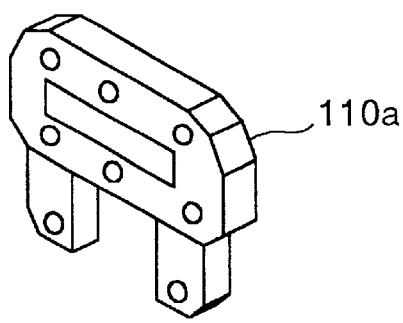
Figure 11C:
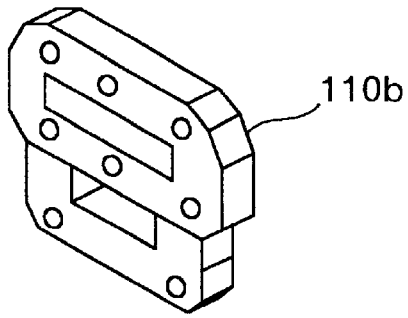

FIGS. 11A, 11B and 11C show a combination of the duct 110 in the linear motor of the present invention.

In FIGS. 11A to 11C, an upper duct 109 is combined with a lower duct 108a or 108b to form a duct 110a or 110b in the embodiment. The upper duct 109 is formed of a nonmagnetic body, and the lower duct 108a or 108b may be either the nonmagnetic body or the ferromagnetic body.

FIGS. 12A to 15C show other embodiments of the divided core in the linear motor of the present invention.

Figure 12A:
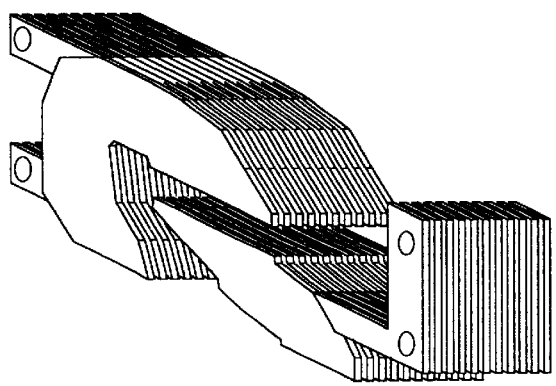
FIGS. 12A, 12B and 12C are views showing another embodiment (No. 3) of the divided core in the armature of the present invention.
Figure 12C:
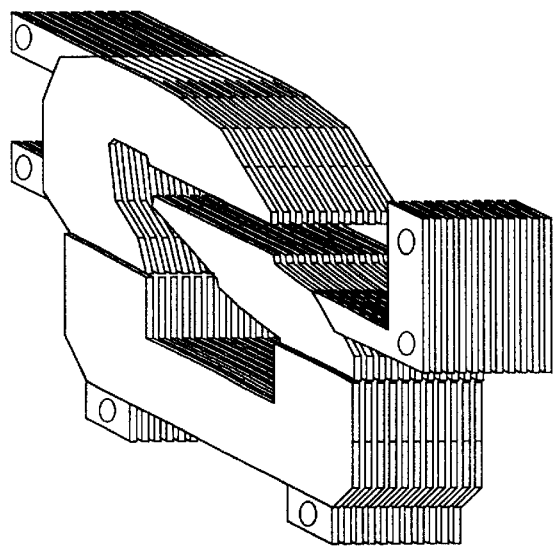
Figure 12B:
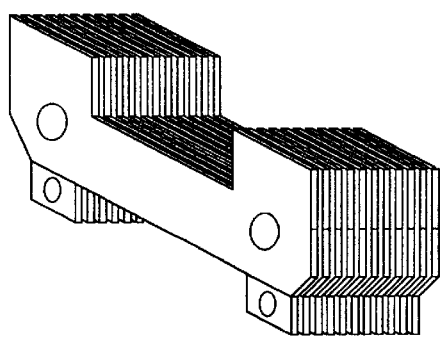

FIGS. 12A, 12B and 12C show another embodiment in which the core having the basic shape shown in FIGS. 7A to 7C is changed to the divided core formed of the laminated steel plates.

In FIGS. 12A to 12C, the method shown in FIG. 9 is used in common when assembling upper and lower core members.

Figure 13A:
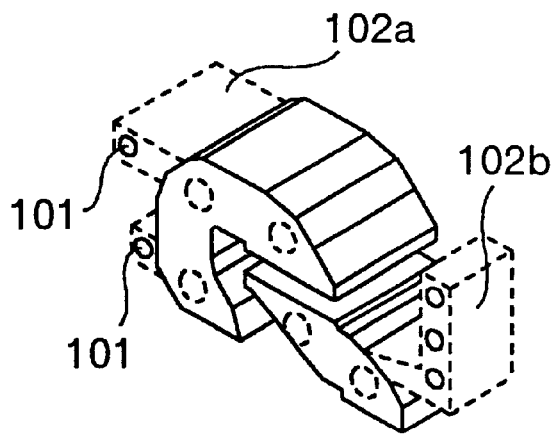
FIGS. 13A, 13B and 13C are views showing another embodiment (No. 4) of the divided core in then armature of the present invention.
Figure 13C:
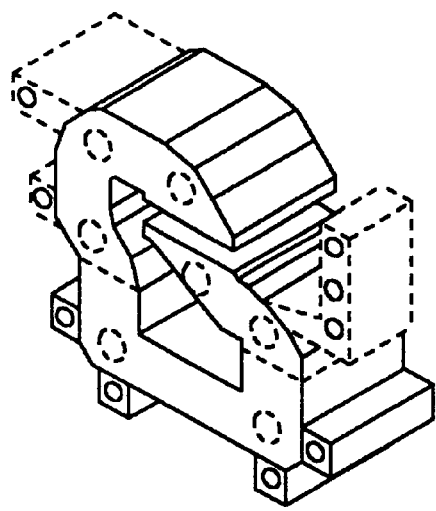
Figure 13B:
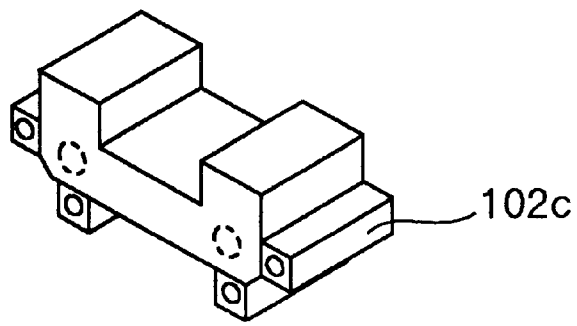

FIGS. 13A, 13B and 13C show a shape in which a solid magnetic body is used instead of the laminated steel plates shown in FIGS. 12A to 12C.

In FIGS. 13A to 13C, the through hole 101 may be disposed on an inner side of the core, or may be disposed in the projected arm 102. Moreover, the through hole 101 formed on the inner side of the core may partially be combined with the through hole formed in the arm 102 in accordance with the purpose. The upper and lower core members may be fixed using fixing members shown in FIGS. 14A, 14B and 14C or using a welding material, an adhesive material, and the like.

Figure 14A:
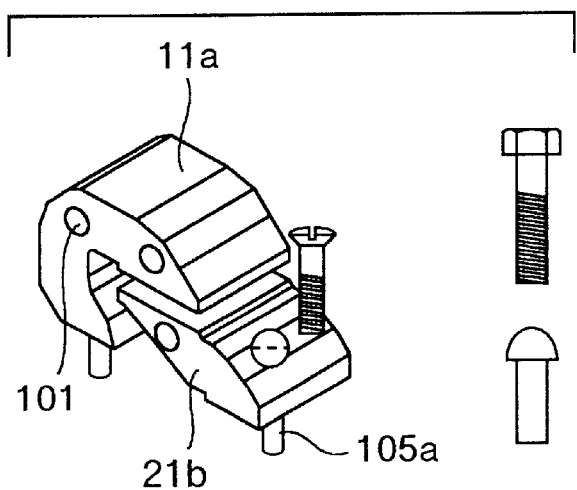
FIGS. 14A, 14B and 14C are views showing another embodiment (No. 5) of the divided core in the armature of the present invention.
Figure 14C:
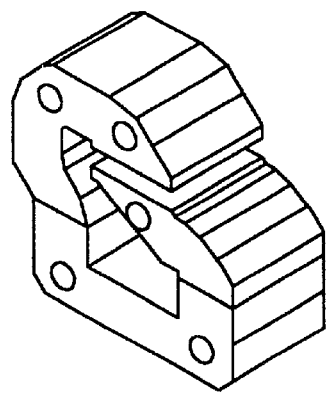
Figure 14B:
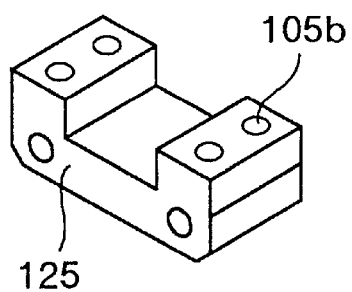

FIGS. 14A to 14C show an embodiment in which the upper core member is engaged with the lower core member via the filing members.

In FIGS. 14A to 14C, a fixing member 105a attached to the upper core member is inserted into a hole 150b formed in the lower core member. In this structure, a bolt, a vis, a pin, a rivet, and the like are used as the fixing member 105a.

Figure 15A:
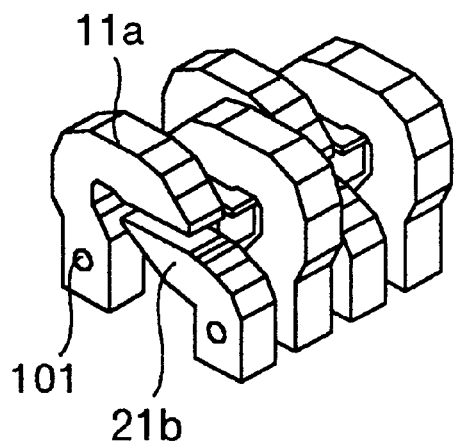
FIGS. 15A, 15B and 15C are views showing another embodiment (No. 6) of the divided core in the armature of the present invention.
Figure 15C:
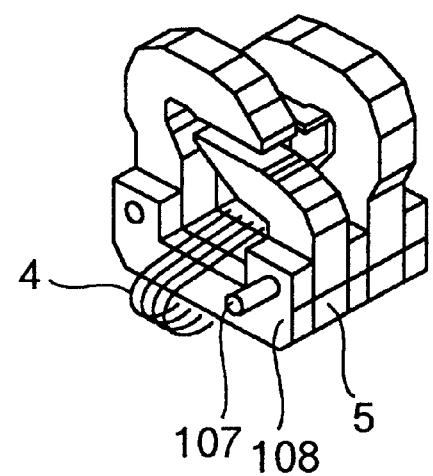
Figure 15B:
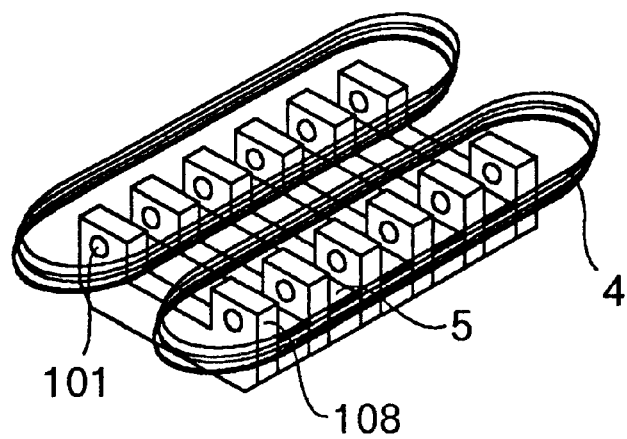

FIGS. 15A, 15B and 15C show another embodiment of the present invention in which the winding 4 is assembled with the upper and lower core members.

In FIGS. 15A to 15C, the core 5 is the same constituting element as the core 5 shown in FIGS. 5A to 5C. The core serves as a core of a magnetic flux generated via the winding 4, and also serves as an effective magnetic path of the upper and lower magnetic pole teeth 11a, 21b. Moreover, a duct 108 held between the cores 5 may be a nonmagnetic body or a magnetic body. FIG. 15C shows one embodiment in which a component of FIG. 15A is assembled with that of FIG. 15B using the fixing member 107.

Figure 16A:
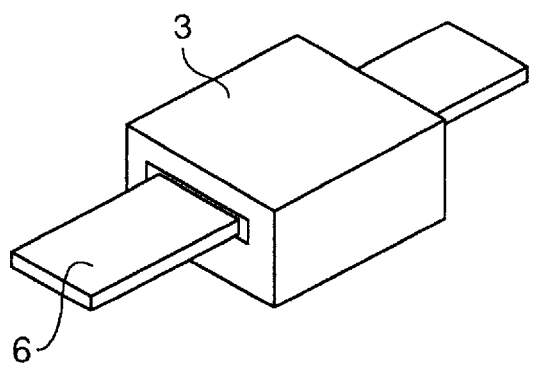
FIGS. 16A, 16B and 16C are views showing embodiments of a molded armature of the present invention.
Figure 16B:
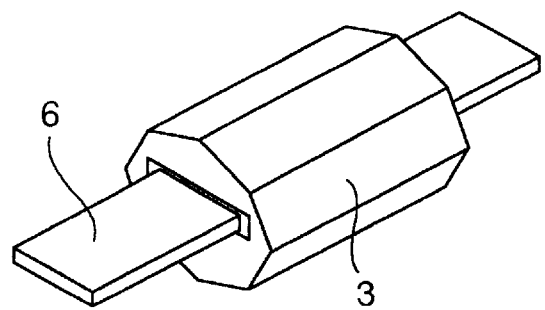
Figure 16C:
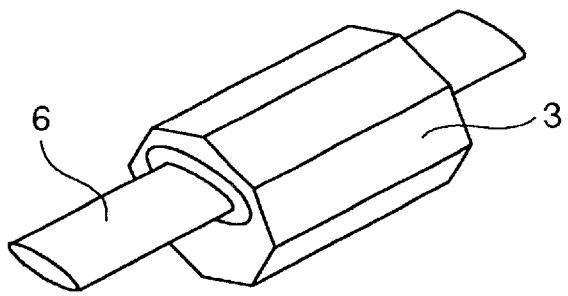

FIGS. 16A, 16B and 16C show embodiments of a molded armature of the present invention.

FIGS. 16A to 16C show respective images in which divided core members formed of the winding, laminated steel plates and solid material are assembled to mold the armature. The armature 3 including the laminated steel plates, winding, and support mechanism (not shown) is molded. Moreover, for the armature 3, as shown in FIG. 3, the armatures are arranged in series as shown in FIG. 3. The respective armatures for A and B phases may individually be molded, or the armatures for multiple phases may be molded together. Also when the armatures are arranged in parallel, the respective armatures for A and B phases may individually be molded, or the armatures for multiple phases may be molded together.

The armature 3 can be formed in a square rod shape, cylindrical shape, and the like in accordance with the core shape. The moving element 6 may also be formed in the square rod shape, cylindrical shape shown in FIG. 4, and the like.

Moreover, in an embodiment other than the aforementioned embodiments of the combinations of the divided core members, only some of the members may be combined. Moreover, the respective constituting elements of the linear motors shown in the accompanying drawings may be combined in an overlapped manner irrespective of the reference numerals, and the combination may also be molded.

Figure 17A:
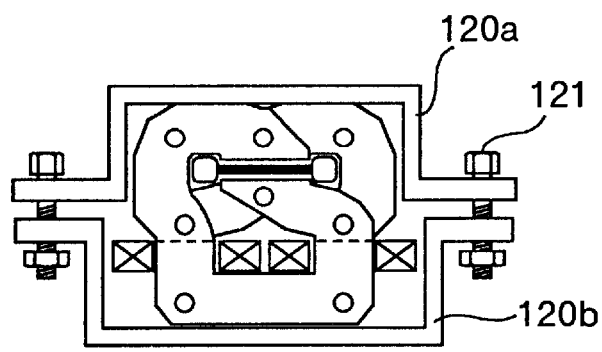
FIGS. 17A, 17B and 17C are views showing embodiments of an assembling method in which a housing is used according td the present invention.
Figure 17B:
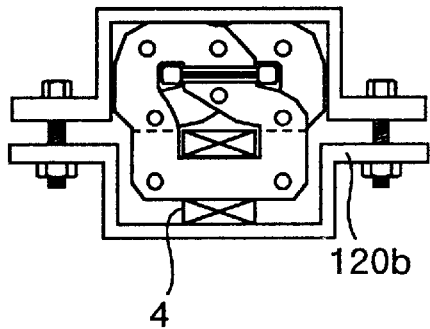
Figure 17C:
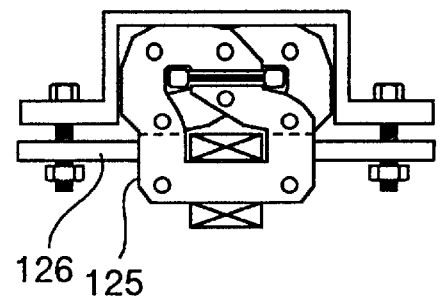

FIGS. 17A, 17B and 17C show an embodiment in which upper and lower housing members are used in an assembling method in the linear motor of the present invention.

In FIGS. 17A to 17C, a core upper housing member 120a is assembled with a lower housing member 120b using a fixing member 121. Here, the bolt, rivet, pin, and the like may be used in the fixing member 121. Moreover, the adhesive material, welding material, and the like may also be used in the assembly.

FIG. 17A schematically shows that the winding is contained on both sides of the core, and FIGS. 17B and 17C show that the winding is contained above and below the core.

As shown in FIG. 17C, only the upper housing member 120a may be assembled with a lower core member 125 and an arm 126 fixed to the core member using the fixing member 121.

Figure 18:
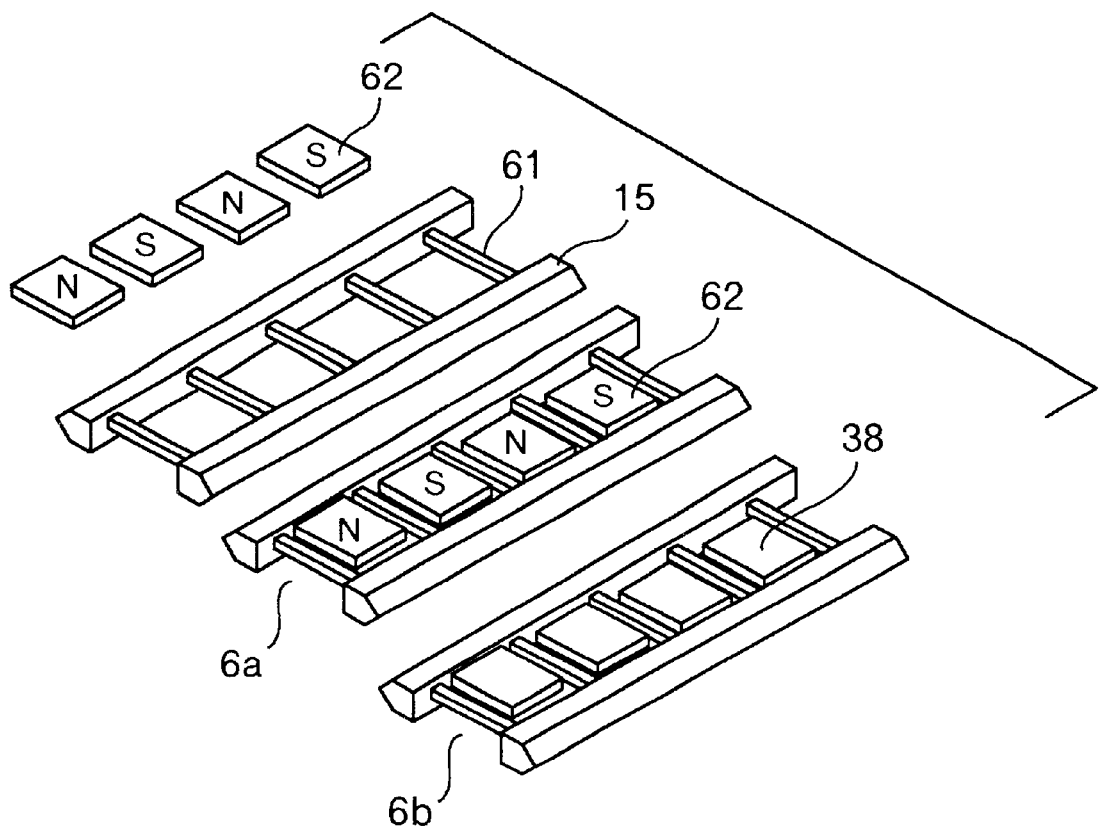
FIG. 18 is a view showing an embodiment for manufacturing the moving element of the present invention.

FIG. 18 shows an embodiment for producing the moving element in the linear motor of the present invention.

In FIG. 18, the moving element 6 is integrally constituted by forming a ladder-shaped frame of the support mechanism 15 and support member 61 and disposing magnetic poles in the frame. A moving element 6a is a moving element with permanent magnets attached thereto, and a moving element 6b is a reluctance type moving element. The support mechanism 15 is supported to reciprocate and move relatively to the support mechanism 14 shown in FIG. 5.

The linear motor of the present invention in which the armature is fixedly supported and the moving element moves has been described above, but the moving element may fixedly be supported such that the armature moves relative to the element.

As described above, according to the embodiment of the present invention, the magnetic path of the magnetic circuit of the effective magnetic flux is shortened in the linear motor, and the leak magnetic flux of the magnetic pole teeth is reduced, so that motor efficiency is enhanced and high output is realized.

Moreover, in the linear motor of the present embodiment, the attraction force acting on the moving element 6 and upper magnetic pole teeth is the same in size as the attraction force acting on the moving element and lower magnetic pole teeth. Additionally, the directions in which the attraction forces are exerted are opposite to each other. Therefore, the entire attraction force is reduced. Since the attraction force between the moving element 6 and the magnetic pole teeth of the armature 3 can be reduced, the burden of the support mechanism can be reduced.

According to the present invention, for example, the magnetic flux leak between the armature and the moving element is reduced, and the magnetic attraction force generated in one direction between the armature and the moving element can be reduced.

What is claimed is:

1. A linear motor including an armature and an element having a magnet, wherein said armature or said element having a magnet is movable, and said armature has a coil, first and second magnetic pole teeth are magnetically coupled to one magnetic pole of said armature and disposed in first and second stages, respectively, which are vertically arranged with respect to a moving direction of said armature or said element having a magnet, third and fourth magnetic pole teeth are magnetically coupled to an other magnetic pole of said armature and disposed in said first and second stages respectively, said first and second magnetic pole teeth are disposed alternately along the moving direction of said armature or said element having a magnet, said third and fourth magnetic pole teeth are disposed alternately along the moving direction of said armature or said element having a magnet, and said first and fourth magnetic pole teeth are disposed so as to substantially oppose one another, and said second and third magnetic pole teeth are disposed so as to substantially oppose one another.

2. The linear motor according to claim 1, wherein when a plurality of said armatures of said linear motor are arranged, and a pole pitch is set to P, a pitch between magnetic pole teeth of the armatures adjacent to each other and different in magnetic poles from each other is (k·P+P/M) {(k=0, 1, 2, . . . ), (M=2, 3, 4, . . . )} {wherein, k denotes a numeral arbitrarily selected in a range in which the armatures adjacent to each other can be arranged, and M denotes the number of phases of the motor}.

3. The linear motor according to claim 1 or 2 wherein said armature is supported in a fixed manner, and said moving element is movable.

4. The linear motor according to claim 1, wherein said first magnetic pole teeth and said fourth magnetic pole teeth are arranged substantially in a vertical direction to a moving direction of said armature or said element having a magnet.

5. The linear motor according to claim 1, wherein said second magnetic pole teeth and said third magnetic pole teeth are arranged substantially in a vertical direction to a moving direction of said armature or said element having a magnet.

6. A method of producing a linear motor which includes an armature and an element having a magnet, wherein said armature or said element having a magnet is movable, and said armature has a coil, first and second magnetic pole teeth are magnetically coupled to one magnetic pole of said armature and disposed in first and second stages, respectively, which are vertically arranged with respect to a moving direction of said armature or said element having a magnet, third and fourth magnetic pole teeth are magnetically coupled to an other magnetic pole of said armature and disposed in said first and second stages respectively, said first and second magnetic pole teeth are disposed alternately along the moving direction of said armature or said element having a magnet, said third and fourth magnetic pole teeth are disposed alternately along the moving direction of said armature or said element having a magnet, and said first and fourth magnetic pole teeth are disposed so as to substantially oppose one another, and said second and third magnetic pole teeth are disposed so as to substantially oppose one another, said method comprising the steps of:
  producing a plurality of armature core bodies divided in a vertical direction with respect to the moving direction of said armature or said element having a magnet;
  containing a winding of said armature in part of a core; and
  assembling said divided armature core bodies and said winding.

7. A method of producing a linear motor which includes an armature and an element having a magnet, wherein said armature or said element having a magnet is movable, and said armature has a coil, first and second magnetic pole teeth are magnetically coupled to one magnetic pole of said armature and disposed in first and second stages, respectively, which are vertically arranged with respect to a moving direction of said armature or said element having a magnet, third and fourth magnetic pole teeth are magnetically coupled to an other magnetic pole of said armature and disposed in said first and second stages respectively, said first and second magnetic pole teeth are disposed alternately along the moving direction of said armature or said element having a magnet, said third and fourth magnetic pole teeth are disposed alternately along the moving direction of said armature or said element having a magnet, and said first and fourth magnetic pole teeth are disposed so as to substantially oppose one another, and said second and third magnetic pole teeth being disposed so as to substantially oppose one another, said method comprising the steps of:
  producing a plurality of armature core bodies divided in a vertical direction with respect to the moving direction of said armature or said element having a magnet;
  containing a winding of said armature in part of a core;
  assembling said divided armature core bodies and said winding;
  disposing said magnetic poles in a ladder-shaped frame comprising a support member; and
  integrally assembling said moving element with a support mechanism.

* * * * *